(12) United States Patent
Ayer et al.

(10) Patent No.: US 6,208,353 B1
(45) Date of Patent: *Mar. 27, 2001

(54) AUTOMATED CARTOGRAPHIC ANNOTATION OF DIGITAL IMAGES

(75) Inventors: Serge Ayer, Fribourg; Martin Vetterli, Grandvaux, both of (CH)

(73) Assignee: Ecole Polytechnique Fedérale de Lausanne, Lausanne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,522

(22) Filed: Sep. 5, 1997

(51) Int. Cl.[7] ................................................. G06F 15/00
(52) U.S. Cl. ............................................................ 345/435
(58) Field of Search ................................... 345/435, 440, 345/439, 441, 442, 113, 114

(56) References Cited

U.S. PATENT DOCUMENTS

| | | | |
|---|---|---|---|
| 4,616,336 | 10/1986 | Robertson et al. | 364/900 |
| 4,847,604 | 7/1989 | Doyle | 340/706 |
| 4,873,513 | 10/1989 | Soults et al. | 340/723 |
| 5,214,720 | 5/1993 | Fety et al. | 382/48 |
| 5,495,581 | 2/1996 | Tsai | 395/154 |
| 5,506,644 | 4/1996 | Suzuki et al. | 354/106 |
| 5,517,419 | 5/1996 | Lanckton et al. | 364/449 |
| 5,523,765 | 6/1996 | Ichikawa | 342/451 |
| 5,550,965 | * 8/1996 | Gabbe et al. | 395/154 |
| 5,557,397 | 9/1996 | Hyde et al. | 356/5.01 |
| 5,600,775 | 2/1997 | King et al. | 395/806 |
| 5,621,871 | 4/1997 | Jaremko et al. | 395/141 |

OTHER PUBLICATIONS

F. Stein et al.,"Map–Based Localization Using the Panoramic Horizon", IEEE Transactions on Robotics and Automation, vol. 11, No. 6, Dec. 1995, pp. 892–896.

K. Mak et al., "Image Maps: Integrating Remote Sensing, GIS, and Cartography", Abstract, p. 214.

R. Patrick O'Connor et al., "User Interface Development for Semi–automated Imagery Exploitation", SPIE vol. 1472 Image Understanding and the Man–Machine Interface III (1991), pp. 25–37.

* cited by examiner

Primary Examiner—Phu K. Nguyen
(74) Attorney, Agent, or Firm—Peter A. Businger

(57) ABSTRACT

For annotating a digital image with information from a digital map, features which are visible from a viewer position are extracted from the map. The extracted features are matched with corresponding features in the image, and feature annotations are transferred from the map to the image to obtain an integrated view. The technique facilitates the annotation of photographs, and it can be included in navigation and simulation systems.

45 Claims, 4 Drawing Sheets

AUTOMATED CARTOGRAPHIC ANNOTATION OF DIGITAL IMAGES

TECHNICAL FIELD

This invention relates to automated processing of digital images and, more particularly, to annotation of such images.

BACKGROUND OF THE INVENTION

Electronic imaging systems have been developed which generate pictorial representations in digital form, using a digital camera or a digitizing scanner, for example, or using a computerized "virtual reality" generator. Typically, an image is represented by an array of a large number of "pixels" for which numerical parameter values are provided. In the case of black-and-white images, a single numerical value is sufficient per pixel, indicating brightness. For color images, three parameters are used, e.g. for levels of red, green and blue, or hue, saturation and intensity.

Digital image representation is advantageous in that such representations can be reproduced without loss, so that there is no degradation of image quality in copying. Also, digital images can be readily transmitted over high-speed data channels, and they can be processed by computerized techniques, e.g. for color correction, for manipulation as by "morphing", and for combining multiple images into a composite panoramic view. Panoramic views, obtained as a composite or otherwise, are of considerable importance to tourism, for example.

In pictorial views such as panoramic views, it is often desirable to annotate prominent features with identifying or characterizing information. For example, in a view of a mountain range, identifying information may be desired for prominent mountain peaks and other features at the horizon.

SUMMARY OF THE INVENTION

We have recognized that annotation of digital pictorial views can be effected by a computerized technique, based on cartographic data in digital form.

DETAILED DESCRIPTION

Using correspondence matching between cartographic and pictorial data, the pictorial data can be annotated with cartographic data.

Figure 1:
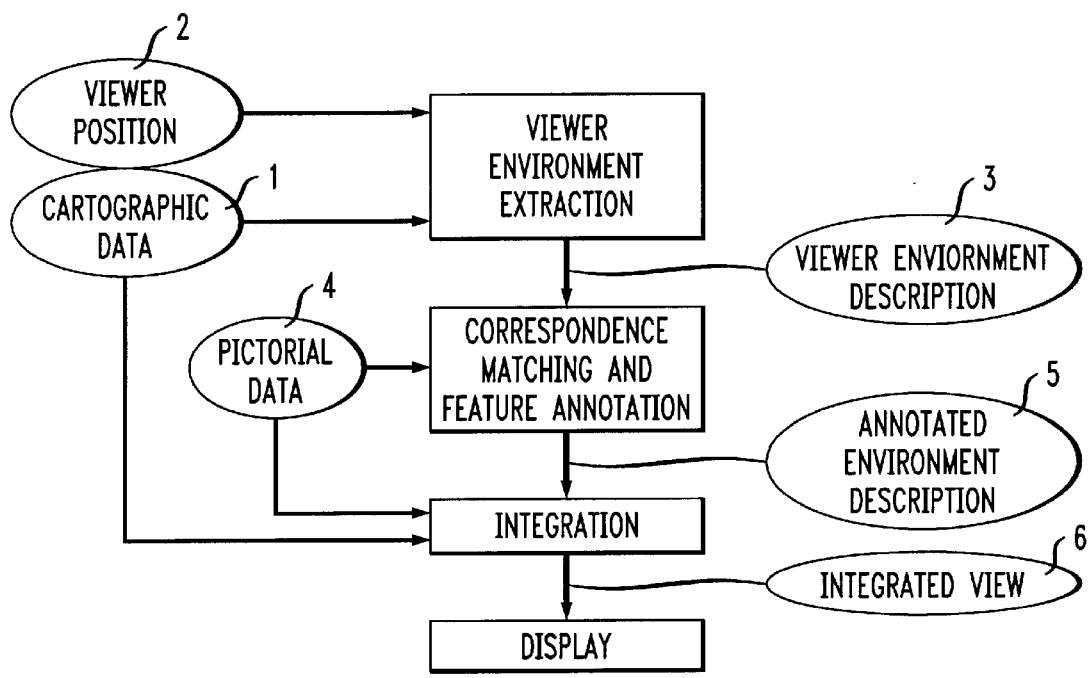
FIG. 1 is a block diagram for the computerized method.

As illustrated by FIG. 1, the technique includes the following procedural steps:

(a) based on given cartographic data 1 and viewer position data 2, extraction of the viewer environment 3, i.e., of cartographic features which are visible from the viewer position;

(b) bringing the extracted cartographic features of the viewer environment 3 into correspondence with features from pictorial data 4;

(c) annotating the features in the pictorial data 4 based on the viewer environment 3, thus generating an annotated environment description 5;

(d) generating a desired integrated view 6 based on the pictorial data 4 and the annotated environment description 5.

Figure 2:
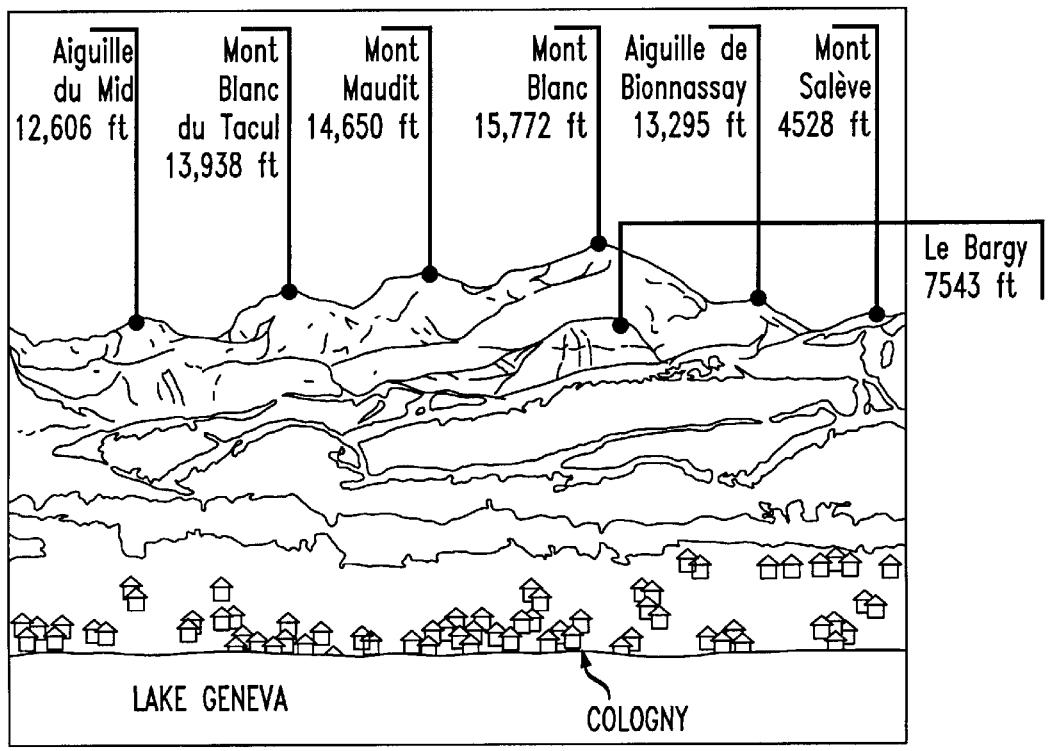
FIG. 2 is a representation of exemplary annotated pictorial output from a system implementing the method.

An example of such an integrated view is shown as FIG. 2. The topographical features are as in a given image, and the textual annotations are taken from cartographic data. Annotated topographical features include six mountain peaks at the horizon, a lake and a town in the foreground, and a further mountain peak at mid-range.

Further details for the steps of the technique are as follows:

(a) Extraction of the Viewer Environment. Given a viewer position, features are identified in the cartographic representation which are visible from the viewer position. Such features can include the horizon line, specific points on the horizon line, and significant geographical features such as lakes, mountains, forests and buildings, for example. The viewer position may be given as included with the pictorial data from the photographer's knowledge or from a localization system such as G.P.S. (Global Positioning System). Also helpful for present purposes are the viewing angle, e.g. as specified by azimuth and elevation, and the focal length of the view to be annotated.

Figure 3:
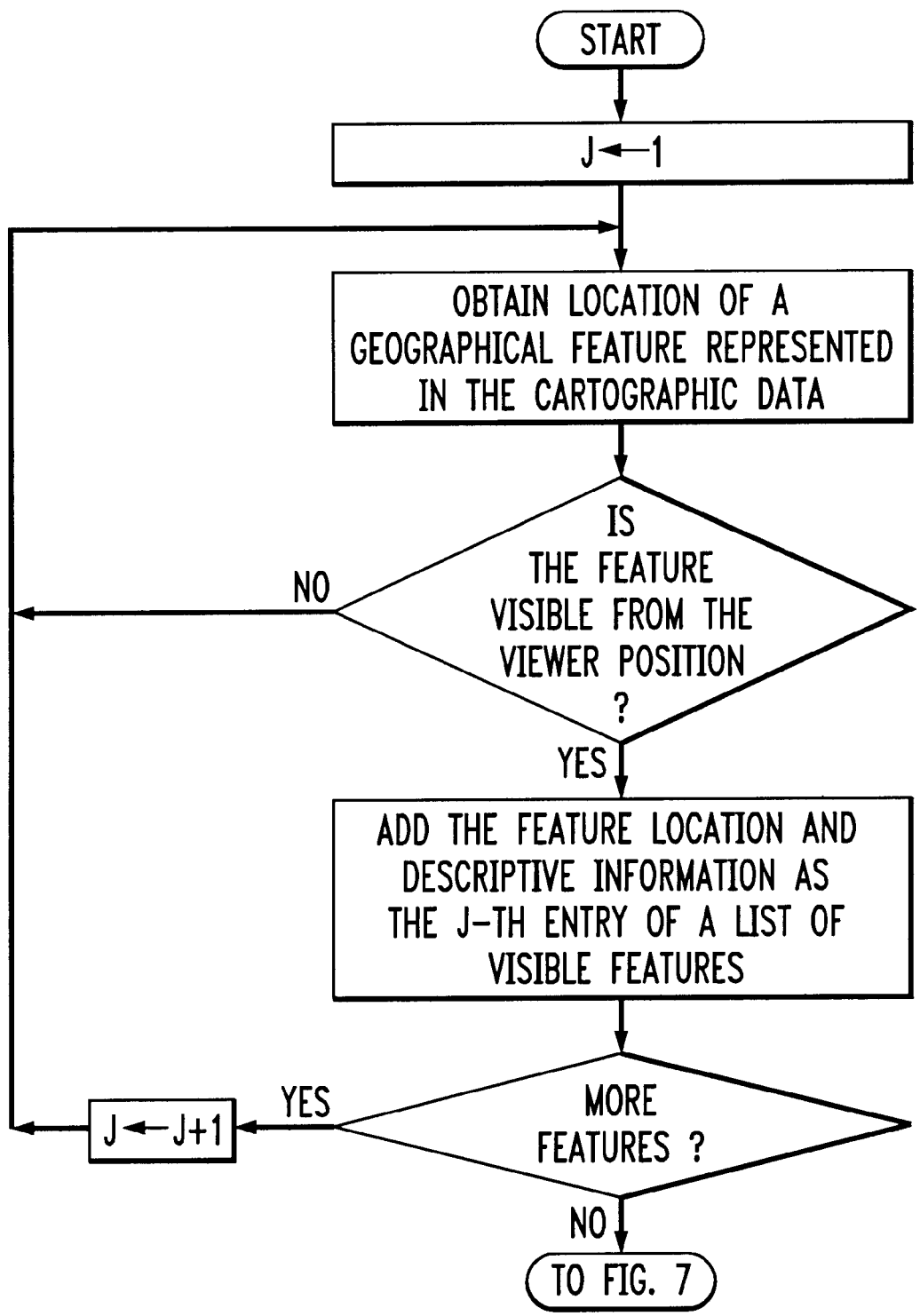
FIG. 3 is a flow diagram for feature extraction in the method.

From the cartographic data, the technique extracts a description of the viewer environment, resulting in a list of objects in view, together with their respective cartographic positions. This procedure is illustrated by FIG. 3. Features represented in the cartographic data are tested for visibility from the viewer position and, for each of the visible features, a table entry is generated including its cartographic position and descriptive information.

Typically, e.g. in extracting the viewer environment for a scenic view, it is important to determine the horizon. A suitable technique for this purpose is illustrated by FIGS. 4–6.

Figure 4:
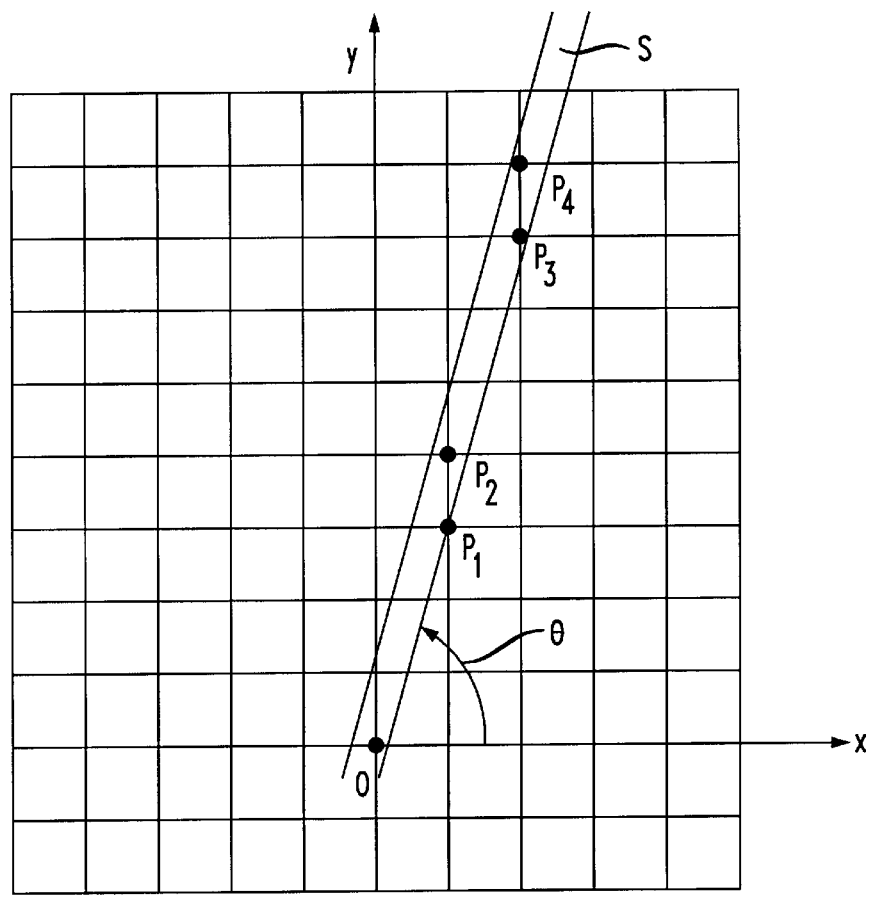
FIG. 4 is a cartographic grid of a map from which the horizon line is to be extracted.

As shown in FIG. 4, with the origin of an x-y-coordinate system chosen at the viewer position O on the map, points $P_i=(x_i, y_i)$ are identified in a narrow strip S originating at the point O and having azimuth angle θ, say.

Figure 5:
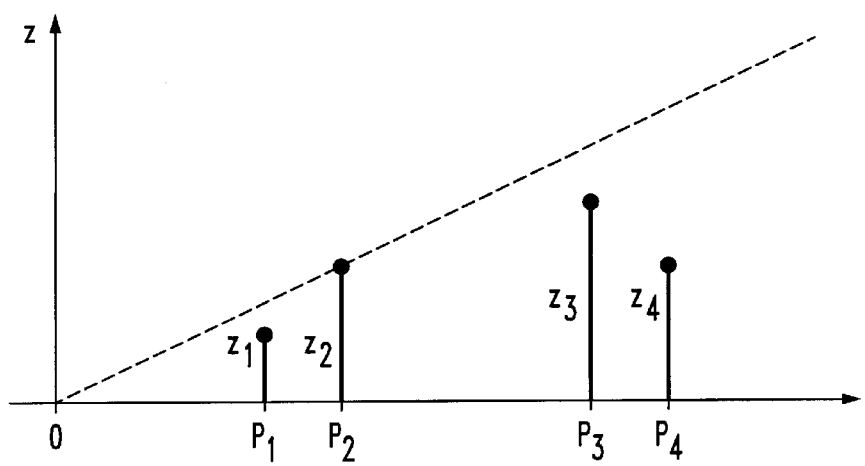
FIG. 5 is an elevation corresponding to a strip in the grid of FIG. 4.
Figure 6:
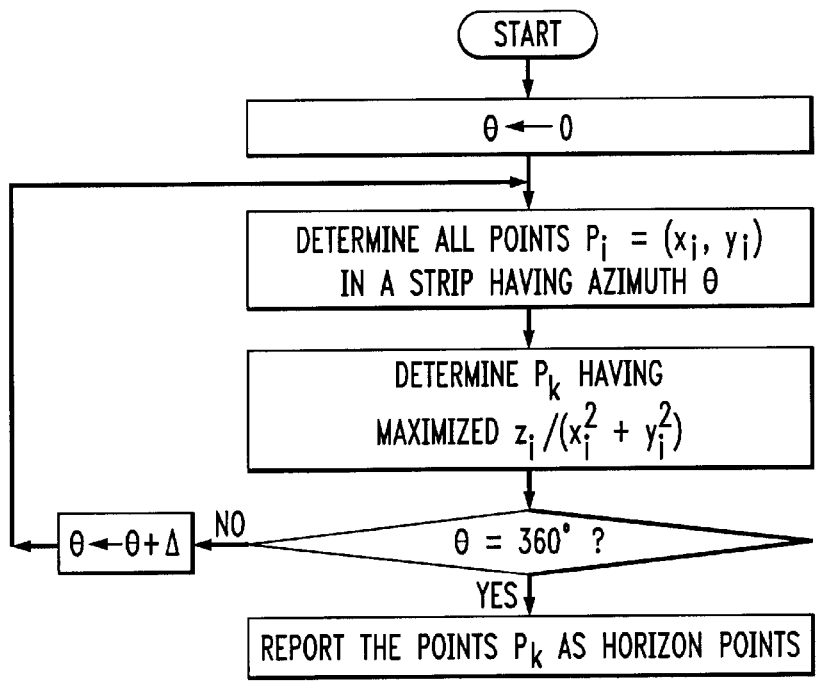
FIG. 6 is a flow diagram for a method of horizon line extraction.

The identified points are shown also in FIG. 5 which is an elevation along the strip S. Shown further are the vertical coordinates $z_i$ corresponding to cartographic altitude. Finding a point of the horizon now amounts to identifying a point $(X_k, Y_k)$ among the points $(x_i, y_i)$ for which the ratio $z_i/(x_i^2+Y_i^2)$ is maximized. In the present case, point $P_2$ is at the horizon.

To obtain the horizon, the strip is swept through 360 degrees, by successively incrementing the value of θ by a small amount, Δ. This procedure is illustrated by FIG. 6. If the view angle is known (at 90 degrees, for example), it suffices to sweep the angle alpha through 180 degrees only. This range may be reduced further if the focal length of the view to be annotated is provided.

In some views, such as panoramic silhouettes, the horizon may be the only part of the viewer environment that is of interest. But the present technique is not so limited, as the extracted viewer environment can include visible features below the horizon. And indeed, the technique is applicable whether or not a view has a horizon of interest.

Figure 7:
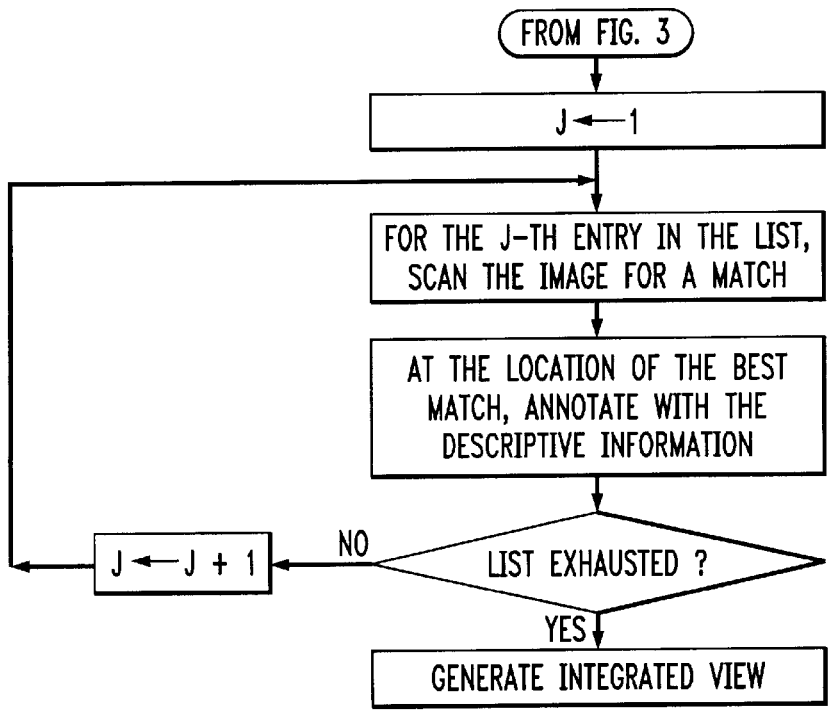
FIG. 7 is a flow diagram for matching and annotation in the method.

(b) Correspondence Matching. A basic type of correspondence matching is illustrated by FIG. 7 which also illustrates steps (c) and (d). For each feature in the viewing environment recorded in step (a), a matching feature is found in the image. Alternatively, the extracted list can be globally matched to the pictorial data, by finding the best over-all match of the viewer environment in the image. A global matching measure can be used that takes into account every object and the confidence of each respective match.

As a simple example, in an image as shown in FIG. 2, the horizon can be traced readily by known techniques, based on the color or brightness of the sky as compared with the terrain. The traced horizon can be matched to the horizon obtained per (a) above, thus yielding a correspondence between features included in the map and features appearing in the image.

Automated matching can be facilitated by suitable calibration, e.g. by interactive establishment of the correspondence between a small number of distinguished points in the map and the image. For example, an user viewing the map and the image side by side may "click" first on a point in the map and then on the corresponding point in the image, thus establishing a first correspondence. The greater the number of correspondences thus established, the easier the technique's task of matching.

Automated matching can be facilitated also if the image is stereographic, i.e. represented by a pair of views from two specified points. Depth information obtained from a stereographic, 3-D view can be used to address ambiguities which a 2-D view may not resolve.

Correspondence matching can be under user control so that a point is annotated in the view when the user clicks on the point.

(c) Annotating. Based on the correspondence per (b) above, there results a list of annotations, with each annotation consisting of the cartographic information together with its position in the image.

(d) Integrated View. Based on their location in the image, the annotations are superposed on the image, resulting in an integrated view.

Successive integrated views can be used for browsing and searching, as each movement in the cartographic domain corresponds to a movement in the image domain and vice-versa. The two movements can be visualized together, thus facilitating browsing.

Another feature of the integrated view is the ability to superimpose different levels of cartographic information onto the picture, both dynamically on a screen or statically for printing. For example, if a view is changed as to focal length as in zooming, different levels of detail in the cartographic data may become relevant for inclusion in the viewer environment.

As, typically, geographical and pictorial data are supplied at different scales, the method can link annotations obtained at one scale with annotations obtained at other scales. For this purpose, a linked pyramid representation of annotations can be used, in which every annotation has offspring at a finer scale and ancestors at a coarser scale. Offspring of an annotation are more detailed annotations of a geographical object, and an ancestor of an annotation is a common annotation of several geographic objects. Some annotations may originate only at a sufficiently fine scale, as corresponding features may not be recognizable at coarser scales.

The following are among contemplated applications for the technique:

automated generation of panoramic views for atlases, for the promotion of tourism, and for tourist information at popular locations;

automated service, e.g. provided on the Internet, for annotating images taken with an electronic camera which also records the viewer position based on G.P.S. input, for example;

automated automotive navigation system producing annotated panoramic views rather than mere cartographic views as at present;

simulation system producing annotated views of terrain, providing for browsing and searching in cartographic and pictorial domains, with coupling of movement in the two domains;

real-time video system with continuous or intermittent annotation.

As an example of the use of a real-time video system, in aerial navigation, a helicopter pilot wearing a head-up display viewer (2-D or 3-D) may activate annotation of terrain features in actual view. In annotating, the system can use G.P.S. position information and available1 cartographic information. In selecting features for annotation, the system can respond to the stance of the pilot's head and/or the pilot's eyes.

In a further application, a video sequence can be annotated after it has been recorded, e.g. as a travel log. In either case, when annotating a view of a video sequence, correspondence matching between cartographic and pictorial features can take advantage of a correspondence established for a previous view in the sequence. The previous correspondence can serve as an "initial guess" from which the desired new correspondence can be established by iterative refinement.

We claim:

1. A method for generating at least one annotated image, comprising the steps of:

(a) extracting at least one cartographic feature whose visibility from a viewer position of the image has been ascertained, from digital cartographic data representing a map which includes the viewer position;
   (b) relating each extracted cartographic feature to a corresponding pictorial feature in the digital image;
   (c) annotating at least one pictorial feature based on the corresponding cartographic feature; and
   (d) generating the annotated image including each annotated pictorial feature.

2. The method of claim 1, wherein, for calibration, step (b) comprises user interaction.

3. The method of claim 2, wherein user interaction comprises clicking on corresponding points in the map and the image.

4. The method of claim 1, wherein step (c) comprises user interaction.

5. The method of claim 4, wherein user interaction comprises clicking on a point in the image.

6. The method of claim 1, wherein the image is one of a pair stereographic images.

7. The method of claim 1, wherein the annotated image is one of a plurality of annotated images wherein at least two of the annotated images correspond to views at different focal lengths.

8. The method of claim 1, wherein the annotated image is one of a plurality of annotated images wherein at least two of the annotated images correspond to views at different viewing angles.

9. The method of claim 1, wherein the annotated image is one of a plurality of annotated images wherein at least two of the annotated images correspond to different viewer positions.

10. The method of claim 1, wherein the annotated image is one of a video sequence of images.

11. A system for generating at least one annotated digital image, comprising:
    (a) means for extracting at least one cartographic feature whose visibility from a viewer position of the image has been ascertained, from digital cartographic data representing a map which includes the viewer position;
    (b) means for relating each extracted cartographic feature to a corresponding pictorial feature in the digital image;
    (c) means for annotating at least one pictorial feature based on the corresponding cartographic feature; and
    (d) means for generating the annotated image including each annotated pictorial feature.

12. The system of claim 11, wherein, for calibration, the means (b) comprises means for facilitating user interaction.

13. The system of claim 12, wherein the means for facilitating user interaction comprises means for clicking on corresponding points in the map and the image.

14. The system of claim 11, wherein the means (c) comprises means for facilitating user interaction.

15. The system of claim 14, wherein the means for facilitating user interaction comprises means for clicking on a point in the image.

16. The system of claim 11, wherein the image is one of a pair stereographic images.

17. The system of claim 11, wherein the annotated image is one of a plurality of annotated images wherein at least two of the annotated images correspond to views at different focal lengths.

18. The system of claim 11, wherein the annotated image is one of a plurality of annotated images wherein at least two of the annotated images correspond to views at different viewing angles.

19. The system of claim 11, wherein the annotated image is one of a plurality of annotated images wherein at least two of the annotated images correspond to different viewer positions.

20. The system of claim 11, wherein the annotated image is one of a video sequence of images.

21. A system for generating at least one annotated digital image, comprising a processor which is instructed for:
    (a) extracting at least one cartographic feature whose visibility from a viewer position of the image has been ascertained, from digital cartographic data representing a map which includes the viewer position;
    (b) relating each extracted cartographic feature to a corresponding pictorial feature in the digital image;
    (c) annotating at least one pictorial feature based on the corresponding cartographic feature; and
    (d) generating the annotated image including each annotated pictorial feature.

22. The system of claim 21, wherein, for calibration, the instructions for (b) comprise instructions for user interaction.

23. The system of claim 22, wherein the instructions for user interaction comprise instructions for clicking on corresponding points in the map and the image.

24. The system of claim 21, wherein the instructions for (c) comprise instructions for user interaction.

25. The system of claim 24, wherein the instructions for user interaction comprise instructions for clicking on a point in the image.

26. The system of claim 21, wherein the image is one of a pair stereographic images.

27. The system of claim 21, wherein the annotated image is one of a plurality of annotated images wherein at least two of the annotated images correspond to views at different focal lengths.

28. The system of claim 21, wherein the annotated image is one of a plurality of annotated images wherein at least two of the annotated images correspond to views at different viewing angles.

29. The system of claim 21, wherein the annotated image is one of a plurality of annotated images wherein at least two of the annotated images correspond to different viewer positions.

30. The system of claim 21, wherein the annotated image is one of a video sequence of images.

31. A method for annotating a video sequence of digital images, comprising the steps of:
    (a) extracting at least one cartographic feature whose visibility from a viewer position of the image has been ascertained, from digital cartographic data representing a map which includes the viewer position;
    (b) relating each extracted cartographic feature to a corresponding pictorial feature in the one of the digital images;
    (c) annotating at least one pictorial feature based on the corresponding cartographic feature; and
    (d) generating an annotated image of the video sequence, including each annotated pictorial feature.

32. The method of claim 31, wherein step (b) comprises using correspondence information generated for an earlier image in the video sequence.

33. The method of claim 31, wherein the video sequence is a recorded video sequence.

34. The method of claim 31, wherein the video sequence is a real-time video sequence.

35. The method of claim 34, wherein step (c) comprises selecting the pictorial feature based on a point of visual attention of a user.

36. A system for annotating a video sequence of digital images, comprising:
    (a) means for extracting at least one cartographic feature which is visible from a viewer position of one of the digital images, from digital cartographic data representing a map which includes the viewer position;
    (b) means for relating each extracted cartographic feature to a corresponding pictorial feature in the one of the digital images;
    (c) means for annotating at least one pictorial feature based on the corresponding cartographic feature; and
    (d) means for generating an annotated image of the video sequence, including each annotated pictorial feature.

37. The system of claim 36, wherein the means (b) comprises means for using correspondence information generated for an earlier image in the video sequence.

38. The system of claim 36, wherein the video sequence is a recorded video sequence.

39. The system of claim 36, wherein the video sequence is a real-time video sequence.

40. The system of claim 39, wherein the means (c) comprises means for selecting the pictorial feature based on a point of visual attention of a user.

41. A system for annotating a video sequence of digital images, comprising a processor which is instructed for:
    (a) extracting at least one cartographic feature whose visibility from a viewer position of the image has been ascertained, from digital cartographic data representing a map which includes the viewer position;

(b) relating each extracted cartographic feature to a corresponding pictorial feature in the one of the digital images;

(c) annotating at least one pictorial feature based on the corresponding cartographic feature; and (d) generating an annotated image of the video sequence, including each annotated pictorial feature.

42. The system of claim 41, wherein the instructions for (b) comprise instructions for using correspondence information generated for an earlier image in the video sequence.

43. The system of claim 41, wherein the video sequence is a recorded video sequence.

44. The system of claim 41, wherein the video sequence is a real-time video sequence.

45. The system of claim 44, wherein the instructions for (c) comprise instructions for selecting the pictorial feature based on a point of visual attention of a user.

* * * * *